United States Patent
Kawakami et al.

(10) Patent No.: US 11,339,252 B2
(45) Date of Patent: May 24, 2022

(54) POLYSILOXAZANE COMPOUND, METHOD FOR PRODUCING THE SAME, AND COMPOSITION CONTAINING THE SAME AND CURED PRODUCT THEREOF

(71) Applicant: Shin-Etsu Chemical Co., Ltd., Tokyo (JP)

(72) Inventors: Masato Kawakami, Joetsu (JP); Shotaro Aoki, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 54 days.

(21) Appl. No.: 16/749,819

(22) Filed: Jan. 22, 2020

(65) Prior Publication Data
US 2020/0239641 A1  Jul. 30, 2020

(30) Foreign Application Priority Data

Jan. 29, 2019 (JP) .............................. JP2019-012667

(51) Int. Cl.
| | | |
|---|---|---|
| *C08G 77/54* | (2006.01) | |
| *C08G 77/62* | (2006.01) | |
| *C08K 3/011* | (2018.01) | |
| *C08G 77/04* | (2006.01) | |
| *C08G 77/14* | (2006.01) | |
| *C08G 77/26* | (2006.01) | |
| *C08K 3/08* | (2006.01) | |

(52) U.S. Cl.
CPC ........... *C08G 77/62* (2013.01); *C08G 77/045* (2013.01); *C08G 77/14* (2013.01); *C08G 77/26* (2013.01); *C08K 3/011* (2018.01); *C08K 3/08* (2013.01); *C08K 2003/0812* (2013.01); *C08K 2003/0881* (2013.01); *C08K 2003/0887* (2013.01)

(58) Field of Classification Search
CPC ............................ C08G 77/452; C08G 77/54
USPC ......................................................... 528/38
See application file for complete search history.

(56) References Cited

U.S. PATENT DOCUMENTS

| | | | | |
|---|---|---|---|---|
| 4,103,045 | A | | 7/1978 | Lesaicherre et al. |
| 4,678,688 | A | * | 7/1987 | Itoh ......................... C08J 7/044 427/387 |
| 4,788,309 | A | * | 11/1988 | Laine ...................... C04B 35/16 528/15 |
| 5,008,422 | A | * | 4/1991 | Blum ...................... C04B 35/16 556/402 |
| 5,322,913 | A | * | 6/1994 | Blum ...................... C04B 35/16 264/239 |
| 5,919,572 | A | * | 7/1999 | Blum .................... C09D 183/14 428/447 |
| 6,329,487 | B1 | | 12/2001 | Abel et al. |
| 6,534,184 | B2 | * | 3/2003 | Knasiak ................. C08G 77/42 528/36 |
| 6,946,536 | B2 | * | 9/2005 | Tashiro ................ C09D 183/14 106/287.11 |
| 10,421,841 | B2 | * | 9/2019 | Grottenmüller ........ H01L 33/56 |
| 10,927,220 | B2 | * | 2/2021 | Grottenmueller ....... C08L 83/14 |
| 2006/0160014 | A1 | | 7/2006 | Nagahara et al. |
| 2010/0331487 | A1 | * | 12/2010 | Yang ....................... C08L 83/16 524/858 |
| 2018/0312641 | A1 | * | 11/2018 | Grottenmüller ....... C08G 77/54 |

(Continued)

FOREIGN PATENT DOCUMENTS

| | | |
|---|---|---|
| CA | 700990 A | 12/1964 |
| JP | 2003-514822 A | 4/2003 |

(Continued)

OTHER PUBLICATIONS

Andrianov et al., "Synthesis of dimethylcyclosiloxanes containing silicon-attached functional groups," Bulletin of the Academy of Sciences of the USSR, Division of Chemical Sciences, vol. 11, No. 2, 1962, pp. 241-245.

(Continued)

*Primary Examiner* — Margaret G Moore

(74) *Attorney, Agent, or Firm* — Birch, Stewart, Kolasch & Birch, LLP.

(57) ABSTRACT

A polysiloxazane compound including a repeating unit of the following general formula (1), and having a number average molecular weight of 500 to 100,000 as measured by gel permeation chromatography versus polystyrene standards,

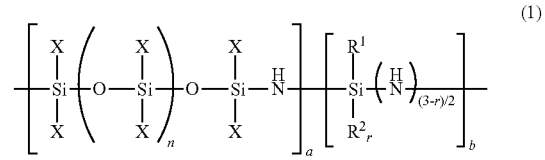

(1)

wherein $R^1$ and $R^2$ each independently represent a substituted or unsubstituted $C_1$-$C_{50}$ monovalent hydrocarbon group optionally containing a hetero atom, Xs each independently represent a methyl group, an oxygen atom, NH—$SiX_2$, or $(NH)_{(3-r)/2}$—$SiR^1R^2_r$ ($R^1$ and $R^2$ have the same meaning as provided above), or Xs are joined to one another to represent an oxygen atom, n is an integer of 0 to 8, when the number of NH—$SiX_2$ is denoted by p, p satisfies $0 \leq p/(2n+4) \leq 0.5$, r is an integer of 0, 1, or 2, and a and b are numbers satisfying $0 < a \leq 1$, $0 \leq b < 1$, and $a+b=1$.

15 Claims, No Drawings

(56) References Cited

U.S. PATENT DOCUMENTS

2020/0024408 A1    1/2020  Grottenmueller et al.
2020/0255599 A1*   8/2020  Grottenmueller .... C08G 77/045

FOREIGN PATENT DOCUMENTS

WO      2017/140407    *  8/2017
WO   WO 2018/100027 A1   6/2018

OTHER PUBLICATIONS

Extended European Search Report for European Application. No. 20152643.1, dated Jun. 19, 2020.

* cited by examiner

POLYSILOXAZANE COMPOUND, METHOD FOR PRODUCING THE SAME, AND COMPOSITION CONTAINING THE SAME AND CURED PRODUCT THEREOF

CROSS-REFERENCE TO RELATED APPLICATION

This non-provisional application claims priority under 35 U.S.C. § 119(a) on Patent Application No. 2019-012667 filed in Japan on Jan. 29, 2019, the entire contents of which are hereby incorporated by reference.

TECHNICAL FIELD

The present invention relates to a polysiloxazane compound, a method for producing the same, and a composition containing the same and a cured product thereof.

BACKGROUND ART

Polysilazane compounds are a group of compounds which are obtainable by amnmonolysis polymerization of a chlorosilane compound having at least two chlorine atoms in the molecule.

Widely used polysilazane compounds include inorganic polysilazanes which are obtainable from dichlorosilane ($H_2SiCl_2$).

On the other hand, polysilazane compounds which are obtainable by ammonolysis polymerization of a chlorosilane compound having an organic substituent are referred to as organic polysilazanes.

The organic polysilazane compounds are a group of compounds to which various properties can be imparted by changing the organic substituent. Examples of the organic polysilazane compound include organic polysilazane compounds obtainable by using dimethyldichlorosilane or methyldichlorosilane (Patent Document 1).

CITATION LIST

Patent Document 1: JP-A 2003-514822

SUMMARY OF THE INVENTION

Since each of dimethyldichlorosilane and methyldichlorosilane has two chlorine atoms in the molecule, polysilazanes of dimethyldichlorosilane and methyldichlorosilane are linear or cyclic polysilazanes. Thus, when the silazane portion is hydrolyzed to form siloxane, the resulting siloxane still has a linear structure and is resistant to becoming cured state, which results in poor workability.

It is expected that, to solve the above problem, when a compound having at least three chlorine atoms in the molecule, such as alkyltrichlorosilane or tetrachlorosilane, is used as a constituent unit to introduce a three-dimensional bridged structure, a polysilazane compound having excellent curability can be obtained.

However, alkyltrichlorosilane has a hydrophobic alkyl group. Thus, to obtain a compound having excellent curability, a short-chain substituent such as methyltrichlorosilane should be introduced.

On the other hand, when synthesis of a polysilazane compound having methyltrichlorosilane or tetrachlorosilane as a constituent unit is performed, isolation of the polysilazane compound requires a lot of effort. When a polysilazane compound is synthesized, a large amount of ammonium chloride is also produced as a byproduct. Accordingly, a method for removing ammonium chloride is important for producing a polysilazane compound efficiently.

A possible method for removing ammonium chloride is, for example, filtration. However, a polysilazane compound to which a methyltrichlorosilane or tetrachlorosilane structure is introduced has low solubility and often becomes solid to form precipitates, leading to very low efficiency in filtration. Accordingly, a long time is necessary until filtrate containing a desired polysilazane compound is obtained.

The above-described problem can be solved by using a method for removing ammonium chloride in which an alkaline aqueous solution is added to the reactant and the resulting mixture is subjected to liquid-liquid separation. Because filtration is not required and the amount of solvent used can be minimized.

However, a polysilazane compound to which a methyltrichlorosilane-derived or tetrachlorosilane-derived structure is introduced is prone to solidify as described above. Further, since the resulting reactant also has a high reactivity, when an alkaline aqueous solution is added, hydrolytic condensation can proceed. The resulting material is insoluble in an organic layer and an aqueous layer, and thus the insoluble solid material is often suspended in the reaction solution.

The present invention has been made under the above circumstances, and an object of the invention is to provide a polysiloxazane compound which has excellent curability and can be easily produced because ammonium chloride as a byproduct can be removed even by liquid-liquid separation, and to provide a composition containing the polysiloxazane compound, and a cured product of the polysiloxazane compound.

The present inventors have made extensive investigations to attain the above object, and have found that precipitation of the solid can be prevented by substituting a part of the methyltrichlorosilane or tetrachlorosilane structure with a siloxane structure. Even though the above-described constituent unit is contained, ammonium chloride can be removed by adding an alkaline aqueous solution. Further, the inventors have also found that a polysiloxazane compound obtained by the above-described method has excellent solubility derived from the siloxane structure, and excellent curability derived from a reactive structure such as methyltrichlorosilane or tetrachlorosilane, and have accomplished the invention.

That is, the present invention provides the following:
1. A polysiloxazane compound including a repeating unit of the following general formula (1), and having a number average molecular weight of 500 to 100,000 as measured by gel permeation chromatography versus polystyrene standards,

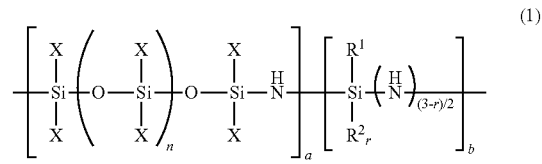

wherein $R^1$ and $R^2$ each independently represent a substituted or unsubstituted $C_1$-$C_{50}$ monovalent hydrocarbon group optionally containing a hetero atom, Xs each independently represent a methyl group, an oxygen atom, NH—$SiX_2$, or $(NH)_{(3-r)/2}$—$SiR^1R^2_r$ ($R^1$ and $R^2$ have the same meaning as provided above), or Xs are joined to one another to represent an oxygen atom, n is an integer of 0 to 8, when the number of NH—SiX$_2$ is denoted by p, p satisfies $0 \leq p/(2n+4) \leq 0.5$, r is an integer of 0, 1, or 2, and a and b are numbers satisfying $0 < a \leq 1$, $0 \leq b < 1$, and $a+b=1$;

2. The polysiloxazane compound according to 1, wherein the repeating unit has the following general formula (2):

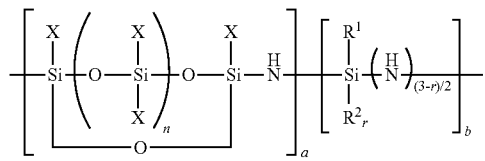

(2)

wherein $R^1$, $R^2$, a, b, n, and r have the same meaning as provided above, Xs each independently represent a methyl group, NH—SiX$_2$, or (NH)$_{(3-r)/2}$—SiR$^1$R$^2_r$ ($R^1$ and $R^2$ have the same meaning as provided above), and when the number of NH—SiX$_2$ is denoted by p, p satisfies $0 \leq p/(2n+2) \leq 0.5$;

3. The polysiloxazane compound according to 1, wherein the repeating unit has the following general formula (3):

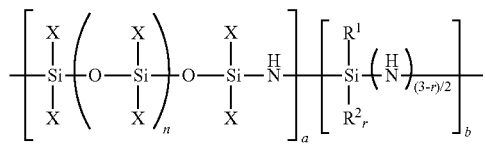

(3)

wherein $R^1$, $R^2$, a, b, n, and r have the same meaning as provided above, Xs each independently represent a methyl group or NH—SiX$_2$, and when the number of NH—SiX$_2$ is denoted by p, p satisfies $0 \leq p/(2n+4) \leq 0.5$;

4. The polysiloxazane compound according to 2, wherein n in the general formula (2) is 2;

5. The polysiloxazane compound according to 3, wherein n in the general formula (3) is 2;

6. A method for producing the polysiloxazane compound according to 1, the method including:

a step of performing ammonolysis homopolymerization of a chlorosiloxane compound of the following general formula (4):

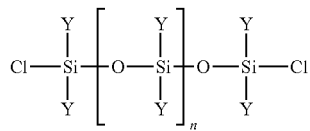

(4)

wherein n has the same meaning as provided above, Ys each independently represent a methyl group, a chlorine atom, or an oxygen atom, or Ys are joined to one another to represent an oxygen atom, and when the number of chlorine atoms is denoted by q, q satisfies $0 \leq q/(2n+2) \leq 0.5$, or a step of mixing a chlorosiloxane compound of the above-described general formula (4) and a chlorosilane compound of the following general formula (5):

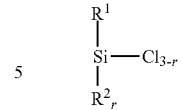

(5)

wherein $R^1$, $R^2$, and r have the same meaning as provided above, and performing ammonolysis polymerization;

7. The method for producing the polysiloxazane compound according to 6, further including a step of adding an alkaline aqueous solution and performing liquid-liquid separation after the above-described ammonolysis polymerization;

8. The method for producing the polysiloxazane compound according to 6 or 7, wherein the chlorosiloxane compound has the following general formula (6):

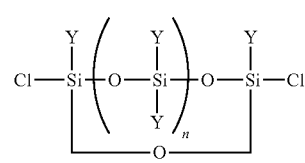

(6)

wherein n has the same meaning as provided above, Ys each independently represent a methyl group or a chlorine atom, and when the number of chlorine atoms is denoted by q, q satisfies $0 \leq q/2n \leq 0.5$;

9. The method for producing the polysiloxazane compound according to 6 or 7, wherein the chlorosiloxane compound has the following general formula (7):

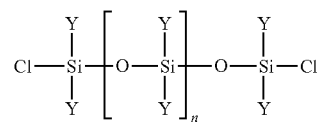

(7)

wherein n has the same meaning as provided above, Ys each independently represent a methyl group or a chlorine atom, and when the number of chlorine atoms is denoted by q, q satisfies $0 \leq q/(2n+2) \leq 0.5$;

10. The method for producing the polysiloxazane compound according to 8, wherein n in the above general formula (6) is 2;

11. The method for producing the polysiloxazane compound according to 9, wherein n in the above general formula (7) is 2;

12. A composition containing the polysiloxazane compound according to any one of 1 to 5, and a solvent;

13. The composition according to 12, wherein the composition is a primer;

14. A curable composition containing the composition according to 13, and at least one metal selected from the group consisting of titanium, aluminum, zinc, and tin;

15. A cured product obtaining by curing the curable composition according to 14.

Advantageous Effects of the Invention

A polysiloxazane compound according to the present invention has excellent solubility since a part of methyltrichlorosilane or tetrachlorosilane structure is substituted with a siloxane structure. Thus, even when an alkaline aqueous solution is added after ammonolysis polymerization, insoluble solid material is not formed around the interface between an organic layer and an aqueous layer, and a corresponding polysiloxazane compound can be easily isolated.

In addition, since the polysiloxazane compound according to the present invention has a highly reactive structure derived from methyltrichlorosilane or tetrachlorosilane, when the polysiloxazane compound is used as a curable composition or the like, a fast film formation becomes possible.

DESCRIPTION OF THE PREFERRED EMBODIMENT

The present invention is described below in detail.

A polysiloxazane compound according to the present invention includes a repeating unit of the following general formula (1), and has a number average molecular weight of 500 to 100,000 as measured by gel permeation chromatography versus polystyrene standards.

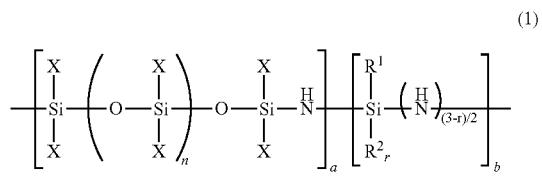
(1)

In the above-described general formula (1), $R^1$ and $R^2$ each independently represent a $C_1$-$C_{50}$, preferably $C_1$-$C_{25}$, and more preferably $C_1$-$C_{10}$ monovalent hydrocarbon group optionally containing a hetero atom.

The $C_1$-$C_{50}$ monovalent hydrocarbon group as the above-described $R^1$ and $R^2$ may be a linear, branched, or cyclic. Specific examples of the monovalent hydrocarbon group include a linear alkyl group such as a methyl, ethyl, n-propyl, n-butyl, n-pentyl, n-hexyl, n-heptyl, n-octyl, decyl, dodecyl, tetradecyl, hexadecyl, octadecyl, or icosyl group; a branched alkyl group such as a isopropyl, isobutyl, sec-butyl, tert-butyl, neopentyl, thexyl, or 2-ethylhexyl group; an alkenyl group such as an allyl, propenyl, butenyl, or pentenyl group; a cyclic alkyl group such as a cyclopentyl or cyclohexyl group; an aryl group such as a phenyl or tolyl group; and an aralkyl group such as a benzyl or phenethyl group.

Further, the above-described monovalent hydrocarbon group may contain a structure containing one or two or more hetero atoms such as an ether group (—O—), a thioether group (—S—), or a siloxane structure.

Furthermore, a part of or all hydrogen atoms of the above-described monovalent hydrocarbon group may be substituted with other substituent. Examples of the substituent include a $C_1$-$C_6$ alkoxy group such as methoxy, ethoxy, or (iso)propoxy group; a halogen atom such as a fluorine atom, a chlorine atom, a bromine atom, or an iodine atom; a $C_6$-$C_{10}$ aryl group such as a phenyl or tolyl group; a $C_7$-$C_{10}$ aralkyl group such as benzyl or phenethyl group; and a trialkylsilyl group, a trialkoxysilyl group, a dialkylmonoalkoxysilyl group, or a monoalkyldialkoxysilyl group in which each alkyl group or each alkoxy group has 1 to 6 carbon atoms.

The above-described siloxane structure refers to, for example, the following general formula (8).

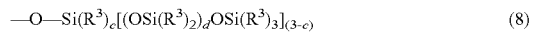
(8)

In Formula (8), $R^3$s each independently represent a $C_1$-$C_{10}$, preferably $C_1$-$C_6$ monovalent hydrocarbon group. A part of or all hydrogen atoms of the monovalent hydrocarbon group may be substituted with a halogen atom. Examples of the halogen atom include the above-described halogen atoms.

The letter c is an integer of 0, 1, 2, or 3, and when c is 0 or 1, a plurality of $OSiR^3_3$ groups may form cyclic siloxane by desiloxane condensation.

The letter d is an integer of 0 to 20, preferably 0 to 15, and more preferably 0 to 8.

The $C_1$-$C_{10}$ hydrocarbon group as above-described $R^3$ may be a linear, branched, or cyclic. Specific examples of the hydrocarbon group include a linear alkyl group such as a methyl, ethyl, n-propyl, n-butyl, n-pentyl, n-hexyl, n-heptyl, n-octyl, or decyl group; a branched alkyl group such as isopropyl, isobutyl, sec-butyl, tert-butyl, neopentyl, thexyl, or 2-ethylhexyl group; a cyclic alkyl group such as a cyclopentyl or cyclohexyl group; an alkenyl group such as an allyl, propenyl, butenyl, or pentenyl group; an aryl group such as a phenyl or tolyl group; and an aralkyl group such as a benzyl or phenethyl group.

In the above-described general formula (8), any combination of $R^3$, c, and d is possible, and the combination is not particularly limited.

Specific examples of the organosiloxane-containing group of the general formula (8), which is defined by the above-described $R^3$, c, and d, include a trialkylsiloxy group such as a trimethylsiloxy, triethylsiloxy, tert-butyldimethylsiloxy, triisopropylsiloxy, or tert-butyldiphenylsiloxy group; a polyalkylpolysiloxane group such as a 1,1,1,3,3-pentamethyldisiloxy, 1,1,1,3,3,5,5-heptamethyltrisiloxy, or 1,1,1,3,3,5,5,7,7-nonamethyltetrasiloxy group; a polyalkylcyclopolysiloxane group such as a 1,1,3,3,5-pentamethylcyclotrisiloxane, 1,1,3,3,5,5,7-heptamethylcyclotetrasiloxane, or 1,1,3,3,5,5,7,7,9-nonamethylcyclopentasiloxane group: and a polyphenylpolysiloxane group such as a 3,5-diphenyl-1,1,1,3,5-pentamethyltrisiloxy, 1,1,1,3,5,7-hexamethyl-3,5,7-triphenyltetrasiloxane, 1,1,1,3,5,7,9-heptamethyl-3,5,7,9-tetraphenylpentasiloxane, 3,3,5,5-tetraphenyl-1,1,1-trimethyltrisiloxy, 3,3,5,5,7,7-hexaphenyl-1,1,1-trimethyltetrasiloxane, or 3,3,5,5,7,7,9,9-octaphenyl-1,1,1-trimethylpentasiloxane.

Among these, as $R^1$ and $R^2$, a $C_1$-$C_{10}$ linear alkyl group optionally substituted with the above-described formula (8) is preferred, and a $C_1$-$C_{10}$ linear alkyl group optionally substituted with a polyalkylpolysiloxane group is more preferred.

In the above-described general formula (1), Xs each independently represent a methyl group, an oxygen atom, NH—$SiX_2$, or $(NH)_{(3-r)/2}$—$SiR^1R^2_r$ ($R^1$ and $R^2$ have the same meaning as provided above), or Xs are joined to one another to represent an oxygen atom.

Herein, when the number of NH—$SiX_2$ is denoted by p, whereas the maximum value of p can be 2n+4, p satisfies $0 \le p/(2n+4) \le 0.5$.

In the general formula (1), when Xs each independently represent a methyl group or NH—$SiX_2$, and the number of NH—$SiX_2$ is denoted by p, whereas the maximum value of p can be 2n+4, p satisfies $0 \le p/(2n+4) \le 0.5$, preferably $0.1 \le p/(2n+4) \le 0.5$, and more preferably $0.2 \le p/(2n+4) \le 0.5$.

The letter n is an integer of 0 to 8, preferably an integer of 0 to 4, and more preferably 2. The structure in the case of n=2 is the following general formula (9):

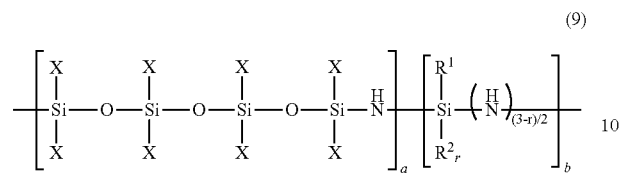
(9)

wherein $R^1$ and $R^2$ have the same meaning as provided above.

In the above-described general formula (1), when a part of Xs are joined to one another to represent an oxygen atom which forms a cyclic structure together with silicon atoms, examples of such structure include a structure of the following general formula (2):

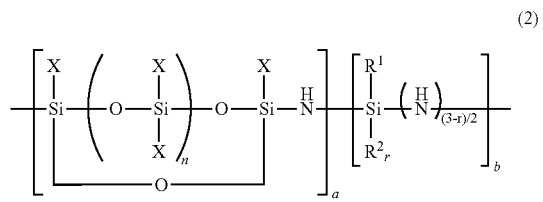
(2)

wherein $R^1$ and $R^2$ have the same meaning as provided above.

In the general formula (2), Xs each independently represent a methyl group, NH—SiX$_2$, or (NH)$_{(3-r)/2}$—SiR$^1$R$^2_r$ ($R^1$ and $R^2$ have the same meaning as provided above), and when the number of NH—SiX$_2$ is denoted by p, whereas the maximum value of p can be 2n+2, p satisfies $0 \leq p/(2n+2) \leq 0.5$, preferably $0.1 \leq p/(2n+2) \leq 0.5$, and more preferably $0.2 \leq p/(2n+2) \leq 0.5$.

The letter n is an integer of 0 to 8, preferably an integer of 0 to 4, and more preferably 2. The structure in the case of n=2 is the following general formula (10):

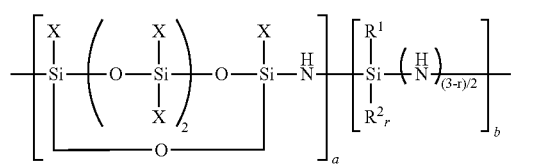
(10)

wherein $R^1$, $R^2$, and X have the same meaning as in the formula (2).

In the above-described general formulae (1), (2), (9), and (10), r is 0, 1, or 2.

The letters a and b satisfy a+b=1, and also satisfy 0<a≤1 and 0≤b<1, preferably 0.1<a<0.9 and 0.1<b<0.9, more preferably 0.2<a<0.8 and 0.2<b<0.8.

A polysilazane compound according to the present invention has a number average molecular weight of 500 to 100,000, and preferably 500 to 10,000 as measured by gel permeation chromatography versus polystyrene standards.

Next, a method for producing the polysiloxazane compound according to the present invention is described below.

The polysiloxazane compound according to the present invention can be obtained by ammonolysis homopolymerization of a chlorosiloxane compound of the following general formula (4), or by mixing a chlorosiloxane compound of the following general formula (4) and a chlorosilane compound of the following general formula (5), and performing ammonolysis polymerization:

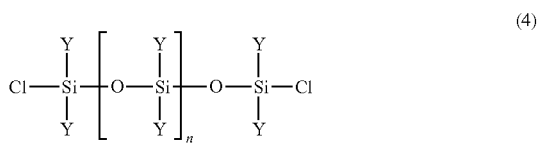
(4)

(5)

wherein $R^1$, $R^2$, n, and r have the same meaning as provided above.

In the general formula (4), Y represents a methyl group or a chlorine atom, or Ys are joined to one another to represent an oxygen atom. When the number of chlorine atoms as Y is denoted by q, q satisfies $0 \leq q/(2n+2) \leq 0.5$.

In the general formula (4), examples of the compound containing a cyclic structure in which Ys are joined to one another to represent an oxygen atom include a chlorosiloxane compound such as a compound of the following general formula (6):

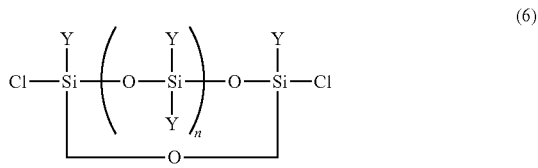
(6)

wherein Y and n have the same meaning as provided above.

In the general formula (6), q, which represents the number of chlorine atoms, satisfies $0 \leq q/2n \leq 0.5$.

In a chlorosiloxane compound of the general formula (4), specific examples of the chlorosiloxane compound in which Ys are a methyl group and a chlorine atom include 1,3-dichloro-tetramethyldisiloxane, 1,3,5-trichloro-1,1,3,5,5-pentamethyltrisiloxane, 1,7-dichloro-1,1,3,3,5,5,7,7-octamethyltetrasiloxane, 1,1,7-trichloro-1,3,3,5,5,7,7-heptamethyltetrasiloxane, 1,3,3,7-tetrachloro-1,1,5,5,7,7-hexamethyltetrasiloxane, α,ω-dichloro-polymethylpolysiloxane, α,β,ω-trichloro-polymethylpolysiloxane, and α,β,β,ω-tetrachloro-polymethylpolysiloxane.

Examples of the chlorosiloxane compound of the general formula (6) include 1,3,5-trichloro-1,3,5-trimethylcyclotrisiloxane and 1,3,5,7-tetrachloro-1,3,5,7-tetramethylcyclotetrasiloxane.

Among these compounds, in particular, the following compounds are preferably used.

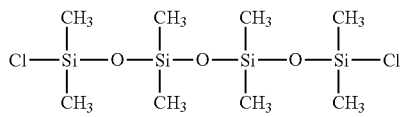

-continued

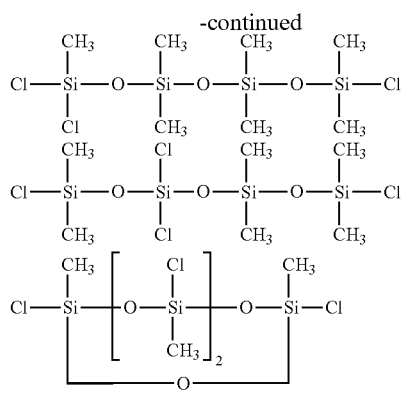

On the other hand, specific examples of the chlorosilane compound of the general formula (5) include propyltrichlorosilane, hexyltrichlorosilane, cyclohexyltrichlorosilane, octyltrichlorosilane, decyltrichlorosilane, dodecyltrichlorosilane, hexadecyltrichlorosilane, octadecyltrichlorosilane, dimethyldichlorosilane, ethylmethyldichlorosilane, hexylmethyldichlorosilane, cyclohexylmethyldichlorosilane, octylmethyldichlorosilane, decylmethyldichlorosilane, dodecylmethyldichlorosilane, hexadecylmethyldichlorosilane, octadecylmethyldichlorosilane, trimethylchlorosilane, ethyldimethylchlorosilane, hexyldimethylchlorosilane, cyclohexyldimethylchlorosilane, octyldimethylchlorosilane, decyldimethylchlorosilane, dodecyldimethylchlorosilane, hexadecyldimethylchlorosilane, octadecyldimethylchlorosilane, diethyldichlorosilane, dibutyldichlorosilane, diisopropyldichlorosilane, dicyclopentyldichlorosilane, triethylchlorosilane, tert-butyldimethylchlorosilane, triisopropylchlorosilane, and tert-butyldiphenylchlorosilane.

The ammonolysis polymerization is performed by introducing ammonia to a chlorosiloxane compound of the general formula (4), or by introducing ammonia to a mixture of a chlorosiloxane compound of the general formula (4) and a chlorosilane compound of the general formula (5).

The ammonolysis polymerization proceeds even without a solvent. However, since ammonium chloride is produced as a byproduct as the ammonolysis polymerization reaction proceeds and stirring becomes difficult, it is preferred that a solvent is used.

Examples of the solvent include a $C_5$-$C_{20}$ aliphatic hydrocarbon compound such as pentane, hexane, cyclohexane, octane, isooctane, nonane, decane, dodecane, or isododecane; a $C_6$-$C_{10}$ aromatic hydrocarbon compound such as benzene, toluene, or xylene; an ether compound such as diethyl ether, tetrahydrofuran, 4-methyltetrahydropyran, cyclopentylmethyl ether, or dioxane; an ester compound such as ethyl acetate, isopropyl acetate, or butyl acetate; an aprotic polar compound such as acetonitrile or N,N-dimethylformamide; a chlorinated hydrocarbon compound such as dichloromethane or chloroform; a siloxane compound having 2 to 10 silicon atoms such as hexamethyldisiloxane, tris(trimethylsiloxy)methylsilane, octamethylcyclotetrasiloxane, or decamethylcyclopentasiloxane. These solvents can be used alone or in combination of two or more as a mixture.

Among these solvents, from the standpoint of solubility of the product, an ether compound is preferred, and 4-methyltetrahydropyran and cyclopentylmethyl ether, which show hydrophobicity, are more preferred.

Although the ammonolysis polymerization proceeds even without a catalyst, when a catalyst is added, the reaction time may be reduced.

Specific examples of the catalyst include a Bronsted acid such as methanesulfonic acid, benzenesulfonic acid, dodecylbenzenesulfonic acid, trifluoromethanesulfonic acid, acetic acid, propionic acid, benzoic acid, or trifluoroacetic acid.

Although the amount of the catalyst added is not particularly limited, the amount is preferably 0.001 to 0.1 mole, and more preferably 0.005 to 0.1 mole per 1 mole of a compound of the general formula (4).

Although the reaction temperature is not particularly limited, the temperature is preferably 0 to 200° C., more preferably 10 to 100° C., and still more preferably 10 to 50° C.

The reaction time is preferably 30 minutes to 24 hours, and more preferably 3 to 15 hours.

Although atmosphere of the reaction is not particularly limited, the atmosphere is, from the standpoint of safety, preferably an inert gas atmosphere such as nitrogen or argon atmosphere.

From the reaction solution after completion of the reaction, a polysiloxazane compound can be recovered by removing precipitated ammonium chloride by filtration, or dissolving ammonium chloride by adding an alkaline aqueous solution and removing the dissolved ammonium chloride. In particular, from the standpoint of increase in yield, a method in which an alkaline aqueous solution is added and the resulting liquid is subjected to liquid-liquid separation is preferred.

Examples of an alkaline component in the alkaline aqueous solution include a hydroxide of an alkali metal such as lithium hydroxide, sodium hydroxide, and potassium hydroxide; and a hydroxide of an alkaline earth metal such as calcium hydroxide.

The alkaline component is preferably used in an amount of 1 to 2 moles, and more preferably in an amount of 1 to 1.5 moles per 1 mole of ammonium chloride produced.

The reaction solution from which ammonium chloride is removed as described above can be directly used for preparation of a composition, and also can be used for the preparation after removing a solvent used in the reaction. When a solvent is removed, the solvent is preferably removed by a method including heating and distilling off the solvent under normal or reduced pressure.

Next, a composition obtained according to the present invention is described below.

The composition according to the present invention contains the above-described polysiloxazane compound and the above-described solvent.

Examples of the solvent include solvents that are the same as the above-described solvents which can be used in the reaction. In particular, from the standpoint of safety, an aliphatic hydrocarbon compound having 8 to 12 carbon atoms and a siloxane compound having 2 to 8 silicon atoms are preferred.

Although the amount of the solvent used is not particularly limited, the solvent is used in an amount so that the concentration of a polysiloxazane composition becomes preferably 0.01 to 50% by weight, more preferably 0.1 to 30% by weight, and still more preferably 5 to 20% by weight.

Although the composition according to the present invention can be used without a catalyst, when a catalyst is added, conversion from a Si—N bond to a Si—O bond can be accelerated.

Examples of the catalyst include titanium catalysts including tetraalkyl orthotitanates such as tetrabutyl orthotitanate, tetramethyl orthotitanate, tetraisopropyl orthotitanate, and tetra-tert-butyl orthotitanate, and a partial hydrolysate of the foregoing tetraalkyl orthotitanates; aluminum catalysts such as aluminum trihydroxide, aluminum alcoholate, aluminum acylate, a salt of aluminum acylate, an aluminosiloxy compound, and an aluminum metal chelate compound; tin catalysts such as dioctyltin dioctate and dioctyltin dilaurate; and zinc catalysts such as tin octanoate and zinc 2-ethylhexanoate.

Although the amount of the catalyst used is not particularly limited, the amount is preferably 0.01 to 25% by weight, more preferably 0.1 to 15% by weight, and still more preferably 0.5 to 10% by weight with respect to the weight of a polysilazane composition according to the present invention.

The composition according to the present invention optionally contains one or more of other additives selected from the group consisting of a pigment, an antifoaming agent, a lubricant, an antiseptic agent, a pH adjuster, a film forming agent, an antistatic agent, an antimicrobial agent, dye, or the like as long as the effect of the present invention is not compromised.

Next, a method for treatment using a composition according to the present invention is described below.

A target for the treatment may be an inorganic material or an organic material.

Examples of the inorganic material include a metal plate, a glass plate, a metal fiber, glass fiber, powdered silica, powdered alumina, powdered talc, and powdered calcium carbonate.

As glass, generally used glass belonging to types such as E glass, C glass, and quartz glass can be used. The quartz glass can be also used as a mold material for nanoimprint.

The glass fiber may be in the assembled form, and may be a fiber bundle, twine, or a woven fabric of glass yarn (filament) having a fiber diameter of 3 to 30 μm.

Examples of the organic material include a natural fiber of, for example, rubber, paper, or cellulose, and plastic.

As a method of treating a target for treatment using a composition according to the present invention, a method generally used can be selected.

Specifically, examples of the method include a method including coating the surface of a target for treatment with a composition containing the polysiloxazane compound as it is or as a diluted composition diluted with a solvent, and drying the coated target.

Although a method for coating in this case is not particularly limited, examples include various publicly known coating methods such as a brushing method, sponge coating, spray coating, a wire bar method, a blade method, a roll coating method, and a dipping method.

In addition, examples of the coating method include a method in which the composition containing a polysilazane compound is entrained with an inert gas, and the resulting gas obtained by the entrainment is brought into contact with a target for treatment, and a method in which a polysilazane composition is directly mixed together with a target for treatment using a mixer or a mill.

The treated material may be dried under any drying conditions. The treated material may be dried at normal or elevated temperature, and is preferably dried at normal temperature.

EXAMPLES

The present invention is described more specifically below with reference to Examples and Comparative Examples, but the present invention is not limited to the Examples.

Conditions for GPC analysis are provided below.

[Conditions for GPC]

System: LC-20AD (manufactured by SHIIMADZU CORPORATION)
Column: LF-404 (4.6 mm×250 mm)×2 (manufactured by SHOWA DENKO K.K.)
Eluent: tetrahydrofuran (THF)
Flow rate: 0.35 ml/min
Detector: RI
Column thermostat temperature: 40° C.
Reference standards: polystyrene Example 1

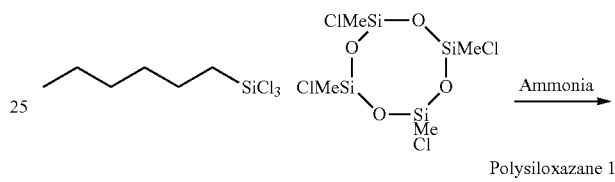

Polysiloxazane 1

A flask equipped with a mixer, a reflux apparatus, a thermometer, and an insertion tube was charged with 26.4 g of hexyltrichlorosilane (0.120 mole), 7.6 g of 1,3,5,7-tetrachloro-1,3,5,7-tetramethylcyclotetrasiloxane (50% by weight solution in toluene, 0.010 mole), and 100.8 g of cyclopentylmethyl ether (hereinafter, referred to as "CPME"), and ammonia was blown into the reaction solution through the insertion tube at a temperature not exceeding 40° C. After ammonia distillate from the top of the reflux apparatus was observed, nitrogen was blown through the insertion tube with stirring to remove remaining ammonia. To the reaction solution, a mixture of 66.8 g of 25% aqueous sodium hydroxide and 40.2 g of water was added. The resulting mixture was stirred at room temperature for 1 hour and allowed to stand, and thereafter liquid-liquid separation was visually observed.

Next, the upper layer was concentrated to distill off the solvent to afford 18.5 g of a reaction product. The resulting compound was subjected to IR analysis, and a peak at 1155 cm$^{-1}$ derived from a Si—N—Si structure and a peak at 3388 cm$^{-1}$ derived from NH were observed. Further, GPC analysis showed that the compound had a number average molecular weight of 1581 to support production of desired Polysiloxazane 1.

Example 2

Reaction and aftertreatment were performed as in Example 1 except that 13.2 g of hexyltrichlorosilane (0.0601 mole), 3.9 g of 1,3,5,7-tetrachloro-1,3,5,7-tetramethylcyclotetrasiloxane (50% by weight solution in toluene, 0.0052 mole) were used, and in addition 52.2 g of toluene was used instead of CPME. As a result, 9.1 g of a reaction product was obtained. In IR analysis, a peak at 1157 cm$^{-1}$ derived from a Si—N—Si structure and a peak at 3387 cm$^{-1}$ derived from NH were observed. Further, GPC analysis showed that the product had a number average molecular weight of 1605 to support production of Polysiloxazane 1.

Example 3

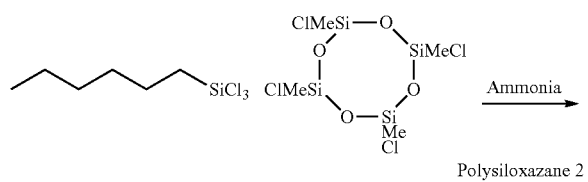

Polysiloxazane 2

A flask equipped with a mixer, a reflux apparatus, a thermometer, and an insertion tube was charged with 17.6 g of hexyltrichlorosilane (0.0801 mole), 15.1 g of 1,3,5,7-tetrachloro-1,3,5,7-tetramethylcyclotetrasiloxane (50% by weight solution in toluene, 0.0200 mole), and 82.3 g of CPME, and ammonia was blown into the reaction solution through the insertion tube at a temperature not exceeding 40° C. After ammonia distillate from the top of the reflux apparatus was observed, nitrogen was blown through the insertion tube with stirring to remove remaining ammonia. To the reaction solution, 28.0 g of 48% aqueous sodium hydroxide was added slowly, the resulting mixture was stirred at room temperature for 1 hour, and thereafter 57.7 g of water was added and further stirred at room temperature for 1 hour. Then, the mixture was allowed to stand, and thereafter liquid-liquid separation was visually observed.

Next, the upper layer was concentrated to distill off the solvent, and 14.0 g of IP SOLVENT 1620 (manufactured by Idemitsu Kosan Co., Ltd.) was added to afford 28.0 g of a reaction product. The product had a nonvolatile content of 50% by weight. The resulting compound was subjected to IR analysis, and a peak at 1162 $cm^{-1}$ derived from a Si—N—Si structure and a peak at 3392 $cm^{-1}$ derived from NH were observed. Further, GPC analysis showed that the compound had a number average molecular weight of 1222 to support production of Polysiloxazane 2.

Example 4

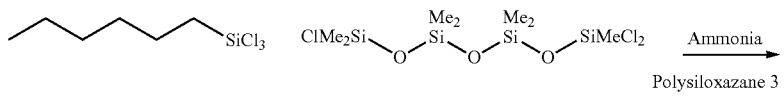

Polysiloxazane 3

Reaction and aftertreatment were performed as in Example 1 except that 26.5 g of hexyltrichlorosilane (0.121 mole), 3.7 g of 1,1,7-trichloro-1,3,3,5,5,7,7-heptamethyltetrasiloxane (0.010 mole) instead of 1,3,5,7-tetrachloro-1,3,5,7-tetramethylcyclotetrasiloxane, and 100.0 g of toluene were used, and in addition 65.1 g of 25% aqueous sodium hydroxide and 39.0 g of water were used. As a result, 20.0 g of a reaction product was obtained. In IR analysis, a peak at 1157 $cm^{-1}$ derived from a Si—N—Si structure and a peak at 3387 $cm^{-1}$ derived from NH were observed. Further, GPC analysis showed that the product had a number average molecular weight of 2057 to support production of Polysiloxazane 3.

Example 5

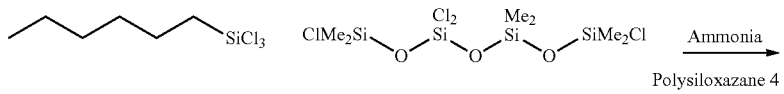

Polysiloxazane 4

Reaction and aftertreatment were performed as in Example 1 except that 26.4 g of hexyltrichlorosilane (0.120 mole), 4.0 g of 1,3,3,7-tetrachloro-1,1,5,5,7,7-hexamethyltetrasiloxane (0.010 mole) instead of 1,3,5,7-tetrachloro-1,3,5,7-tetramethylcyclotetrasiloxane, and 99.1 g of 4-methyltetrahydropyran (hereinafter referred to as "MTHP") instead of CPME were used, and in addition 67.2 g of 25% aqueous sodium hydroxide and 40.1 g of water were used. As a result, 19.5 g of a reaction product was obtained. In IR analysis, a peak at 1155 $cm^{-1}$ derived from a Si—N—Si structure and a peak at 3388 $cm^{-1}$ derived from NH were observed. Further, GPC analysis showed that the product had a number average molecular weight of 2051 to support production of Polysiloxazane 4.

Example 6

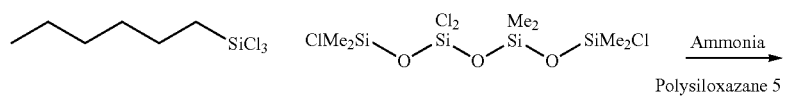

Reaction and aftertreatment were performed as in Example 5 except that 17.7 g of hexyltrichlorosilane (0.0806 mole), 7.9 g of 1,3,3,7-tetrachloro-1,1,5,5,7,7-hexamethyltetrasiloxane (0.020 mole), and 83.5 g of MTHP were used, and in addition 54.1 g of 25% aqueous sodium hydroxide and 33.0 g of water were used. As a result, 16.3 g of a reaction product was obtained. In IR analysis, a peak at 1159 cm$^{-1}$ derived from a Si—N—Si structure and a peak at 3390 cm$^{-1}$ derived from NH were observed. Further, GPC analysis showed that the product had a number average molecular weight of 1580 to support production of Polysiloxazane 5.

Example 7

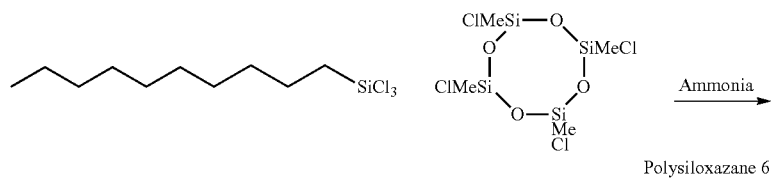

A flask equipped with a mixer, a reflux apparatus, a thermometer, and an insertion tube was charged with 33.0 g of decyltrichlorosilane (0.120 mole), 7.6 g of 1,3,5,7-tetrachloro-1,3,5,7-tetramethylcyclotetrasiloxane (50% by weight solution in toluene, 0.010 mole), and 108.0 g of MTHP, and ammonia was blown into the reaction solution through the insertion tube at a temperature not exceeding 40° C. After ammonia distillate from the top of the reflux apparatus was observed, nitrogen was blown through the insertion tube with stirring to remove remaining ammonia. To the reaction solution, 35.0 g of 48% aqueous sodium hydroxide was added slowly, the resulting mixture was stirred at room temperature for 1 hour, and thereafter 72.2 g of water was added and further stirred at room temperature for 1 hour. Then, the mixture was allowed to stand, and thereafter liquid-liquid separation was visually observed.

Next, the upper layer was concentrated to distill off the solvent, and 40 g of IP SOLVENT 1620 (manufactured by Idemitsu Kosan Co., Ltd.) was added to afford 61.1 g of a reaction product. The product had a nonvolatile content of 40% by weight. The resulting compound was subjected to IR analysis under the following conditions, and a peak at 1164 cm$^{-1}$ derived from a Si—N—Si structure and a peak at 3386 cm$^{-1}$ derived from NH were observed. Further, GPC analysis showed that the compound had a number average molecular weight of 2822 to support production of Polysiloxazane 6.

Example 8

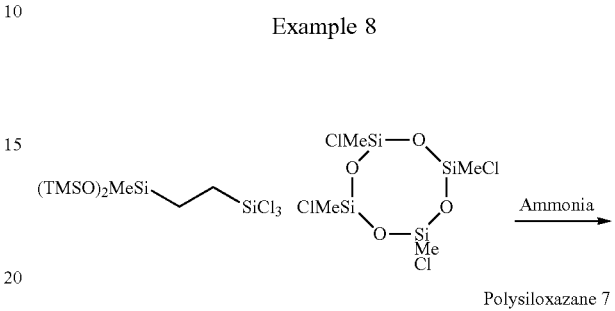

A flask equipped with a mixer, a reflux apparatus, a thermometer, and an insertion tube was charged with 19.2 g of 1-trichlorosilyl-2-bis(trimethylsiloxy)methylsilylethane (0.0500 mole), 9.6 g of 1,3,5,7-tetrachloro-1,3,5,7-tetramethylcyclotetrasiloxane (50% by weight solution in toluene, 0.013 mole), and 50.9 g of MTHP, and ammonia was blown into the reaction solution through the insertion tube at a temperature not exceeding 40° C. After ammonia distillate from the top of the reflux apparatus was observed, nitrogen was blown through the insertion tube with stirring to remove remaining ammonia. To the reaction solution, 17.7 g of 48% aqueous sodium hydroxide was added slowly, the resulting mixture was stirred at room temperature for 1 hour, and thereafter 36.1 g of water was added and further stirred at room temperature for 1 hour. Then, the mixture was allowed to stand, and thereafter liquid-liquid separation was visually observed.

The upper layer was concentrated to distill off the solvent to afford 17.9 g of a reaction product. In IR analysis, a peak at 1177 cm$^{-1}$ derived from a Si—N—Si structure and a peak at 3388 cm$^{-1}$ derived from NH were observed. Further, GPC analysis showed that the product had a number average molecular weight of 3699 to support production of Polysiloxazane 7.

Example 9

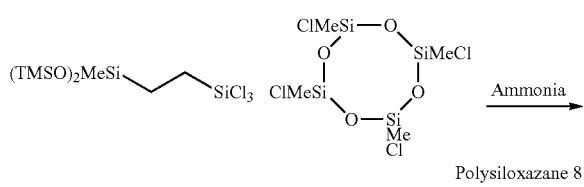

Polysiloxazane 8

Reaction and aftertreatment were performed as in Example 8 except that 15.4 g of 1-trichlorosilyl-2-bis(trimethylsiloxy)methylsilylethane (0.0401 mole), 22.7 g of 1,3,5,7-tetrachloro-1,3,5,7-tetramethylcyclotetrasiloxane (50% by weight solution in toluene, 0.0300 mole), and 59.6 g of CPME instead of MTHP were used, and in addition 21.0 g of 48% aqueous sodium hydroxide and 43.3 g of water were used.

After the upper layer was concentrated, 20.8 g of tris(trimethylsiloxy)methylsilane was added to afford 34.0 g of a reaction product. The product had a nonvolatile content of 50% by weight. In IR analysis, a peak at 942 cm$^{-1}$ derived from a Si—N—Si structure and a peak at 3392 cm$^{-1}$ derived from NH were observed. Further, GPC analysis showed that the product had a number average molecular weight of 2282 to support production of Polysiloxazane 8.

Example 10

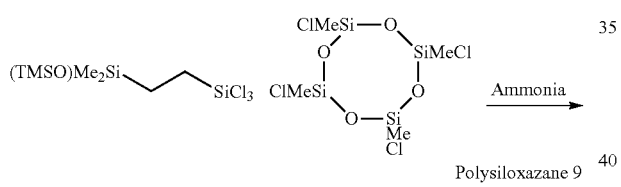

Polysiloxazane 9

Reaction and aftertreatment were performed as in Example 8 except that 15.6 g of 1-trichlorosilyl-2-dimethyl(trimethylsiloxy)silylethane (0.0503 mole) instead of 1-trichlorosilyl-2-bis(trimethylsiloxy)methylsilylethane, 9.6 g of 1,3,5,7-tetrachloro-1,3,5,7-tetramethylcyclotetrasiloxane (50% by weight solution in toluene, 0.013 mole), and 50.7 g of MTHP were used, and in addition 17.7 g of 48% aqueous sodium hydroxide and 36.3 g of water were used.

After the upper layer was concentrated, 10.7 g of tris(trimethylsiloxy)methylsilane was added to afford 23.4 g of a reaction product. The product had a nonvolatile content of 50% by weight. In IR analysis, a peak at 941 cm$^{-1}$ derived from a Si—N—Si structure and a peak at 3393 cm$^{-1}$ derived from NH were observed. Further, GPC analysis showed that the product had a number average molecular weight of 2147 to support production of Polysiloxazane 9.

Comparative Example 1

A flask equipped with a mixer, a reflux apparatus, a thermometer, and an insertion tube was charged with 13.1 g of hexyltrichlorosilane (0.0597 mole), 3.0 g of methyltrichlorosilane (0.020 mole), and 61.8 g of CPME, and ammonia was blown into the reaction solution through the insertion tube at a temperature not exceeding 40° C. After ammonia distillate from the top of the reflux apparatus was observed, nitrogen was blown through the insertion tube with stirring to remove remaining ammonia. To the reaction solution, a mixture of 40.3 g of 25% aqueous sodium hydroxide and 24.0 g of water was added, the resulting mixture was stirred at room temperature for 1 hour, and thereafter liquid-liquid separation was visually observed. The upper layer was concentrated to afford 9.4 g of a reaction product.

Comparative Example 2

Reaction and aftertreatment were performed as in Comparative Example 1 to afford a reaction product except that 19.9 g of hexyltrichlorosilane (0.0906 mole) and 4.6 g of methyltrichlorosilane (0.031 mole) were used, 90.0 g of toluene was used instead of CPME, and in addition 60.5 g of 25% aqueous sodium hydroxide and 36.4 g of water were used.

Comparative Example 3

Reaction and aftertreatment were performed as in Comparative Example 1 to afford a reaction product except that 11.2 g of hexyltrichlorosilane (0.0510 mole), 7.5 g of methyltrichlorosilane (0.050 mole), and 77.5 g of CPME were used, and in addition 50.4 g of 25% aqueous sodium hydroxide and 30.0 g of water were used.

Comparative Example 4

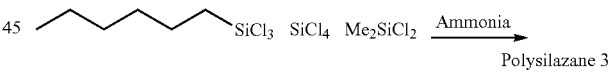

Reaction and aftertreatment were performed as in Comparative Example 1 to afford a reaction product except that 17.7 g of hexyltrichlorosilane (0.0806 mole), 3.5 g of tetrachlorosilane (0.021 mole), 7.9 g of dimethyldichlorosilane (0.061 mole), and 113.9 g of MTHP were used, and in addition 74.0 g of 25% aqueous sodium hydroxide and 44.1 g of water were used.

Comparative Example 5

Reaction and aftertreatment were performed as in Comparative Example 1 to afford a reaction product except that 32.9 g of hexyltrichlorosilane (0.150 mole) and 6.5 g of dimethyldichlorosilane (0.050 mole) were used, 143.6 g of toluene was used instead of CPME, and in addition 92.5 g of 25% aqueous sodium hydroxide and 55.3 g of water were used.

Comparative Example 6

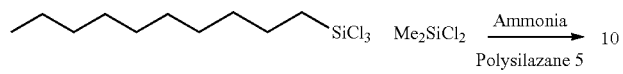

Reaction and aftertreatment were performed as in Comparative Example 5 to afford a reaction product except that 24.8 g of decyltrichlorosilane (0.0900 mole) instead of hexyltrichlorosilane, 4.0 g of dimethyldichlorosilane (0.031 mole), and 85.0 g of toluene were used, and in addition 55.4 g of 25% aqueous sodium hydroxide and 33.1 g of water were used.

With respect to polysiloxazane compounds and polysilazane compounds obtained in the above-described Examples and Comparative Examples, the following various kinds of evaluation were performed. The results are shown in Table 1 and Table 2.

(2) Solubility

Each of the compounds obtained in Examples and Comparative Examples was diluted with isoparaffin solvent IP SOLVENT 1620 (manufactured by Idemitsu Kosan Co., Ltd.) so that the resulting solution contains 20% by weight of the compound, and the results were classified into categories A and B as follows.

A: A 20% by weight solution could be prepared.

B: There were undissolved materials, and a 20% by weight solution could not be prepared.

(3) Curability

Each of the solutions prepared above for evaluating solubility was applied (at a thickness of 30 μm) to a substrate (a polished steel plate) using a bar coater, and tack-free time (time for dry to the touch, time until the coated material has cured and becomes incapable of adhering to a fingertip touched to the coated material) was measured under conditions at 25° C. and 50% RH. In Example 8 and Comparative Example 6, 1% by weight of tetrabutoxy titanium was further added to the 20% by weight solution before evaluation of curability.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Polysiloxazane | 1 | 1 | 2 | 3 | 4 | 5 | 6 | 7 | 8 | 9 |
| Solvent | CPME | Toluene | CPME | Toluene | MTHP | MTHP | MTHP | MTHP | CPME | MTHP |
| Liquid-liquid separation | A | B | B | A | A | B | B | A | B | B |
| Solubility | A | A | A | A | A | A | A | A | A | A |
| Curing time (h) | 1 | — | — | 3 | — | — | — | 1 | — | — |

TABLE 2

| | Comparative Example | | | | | |
|---|---|---|---|---|---|---|
| | 1 | 2 | 3 | 4 | 5 | 6 |
| Polysilazane | 1 | 1 | 2 | 3 | 4 | 5 |
| Solvent | CPME | Toluene | CPME | MTHP | MTHP | MTHP |
| Liquid-liquid separation | C | D | D | D | B | B |
| Solubility | B | — | — | — | A | A |
| Curing time (h) | — | — | — | — | 4 | 3 |

(1) Liquid-Liquid Separation

Results of liquid-liquid separation in the above-described Examples and Comparative Examples were classified into categories A, B, C, and D.

A: There was almost no insoluble solid material around the interface between an organic layer and an aqueous layer.

B: There were some insoluble solid materials around the interface, but the amount was small and the interface was visually observed.

C: There were insoluble solid materials around the interface, and the interface was not visually observed.

D: There were a large amount of insoluble materials around the interface, and the interface was not visually observed.

As shown in Tables 1 and 2, it is understood that a polysiloxazane compound according to the present invention produces almost no insoluble solid material when subjected to liquid-liquid separation, and can be easily produced. Polysiloxazane compounds obtained in Examples 1 to 10 are highly soluble in an isoparaffin solvent, but a polysilazane compound in Comparative Example 1 is slightly soluble in an isoparaffin solvent. Further, according to the results of Example 1 and Comparative Example 5, and Example 8 and Comparative Example 6, it is understood that since a methyltrichlorosilane-derived structure is introduced to a polysiloxazane compound according to the present invention, the polysiloxazane compound according to the present invention is superior in curability to a polysilazane compound that has no methyltrichlorosilane-derived structure.

Japanese Patent Application No. 2019-012667 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A polysiloxazane compound comprising a repeating unit of the following general formula (1), and having a number average molecular weight of 500 to 100,000 as measured by gel permeation chromatography versus polystyrene standards,

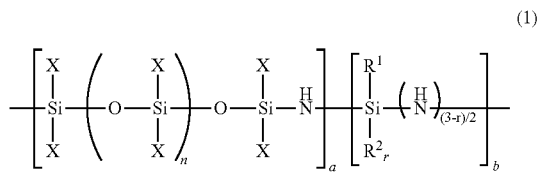
(1)

wherein $R^1$ and $R^2$ each independently represent a substituted or unsubstituted $C_1$-$C_{50}$ monovalent hydrocarbon group optionally containing a hetero atom, Xs each independently represent a methyl group, an oxygen atom, NH—SiX$_2$, or (NH)$_{(3-r)/2}$—SiR$^1$R$^2_r$ ($R^1$ and $R^2$ have the same meaning as provided above), or Xs are joined to one another to represent an oxygen atom, n is an integer of 2 to 4, when the number of NH—SiX$_2$ is denoted by p, p satisfies $0<p/(2n+4)\leq 0.5$, r is an integer of 0, 1, or 2, and a and b are numbers satisfying $0<a\leq 1$, $0\leq b<1$, and $a+b=1$.

2. The polysiloxazane compound according to claim 1, wherein the repeating unit has the following general formula (2):

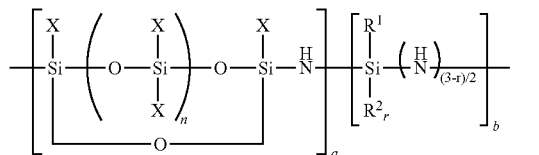
(2)

wherein $R^1$, $R^2$, a, b, n, and r have the same meaning as provided above, Xs each independently represent a methyl group, NH—SiX$_2$, or (NH)$_{(3-r)/2}$—SiR$^1$R$^2_r$ ($R^1$ and $R^2$ have the same meaning as provided above), and when the number of NH—SiX$_2$ is denoted by p, p satisfies $0<p/(2n+2)\leq 0.5$.

3. The polysiloxazane compound according to claim 1, wherein the repeating unit has the following general formula (3):

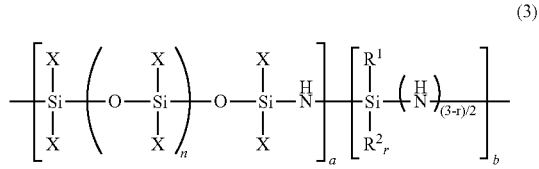
(3)

wherein $R^1$, $R^2$, a, b, n, and r have the same meaning as provided above, Xs each independently represent a methyl group or NH—SiX$_2$, when the number of NH—SiX$_2$ is denoted by p, p satisfies $0<p/(2n+4)\leq 0.5$.

4. The polysiloxazane compound according to claim 2, wherein n in the general formula (2) is 2.

5. The polysiloxazane compound according to claim 3, wherein n in the general formula (3) is 2.

6. A method for producing the polysiloxazane compound according to claim 1, the method comprising:

a step of performing ammonolysis homopolymerization of a chlorosiloxane compound of the following general formula (4):

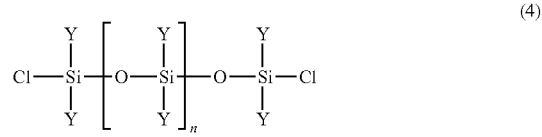
(4)

wherein n has the same meaning as provided above, Ys each independently represent a methyl group, a chlorine atom, or an oxygen atom, or Ys are joined to one another to represent an oxygen atom, and when the number of chlorine atoms is denoted by q, q satisfies $0<q/(2n+2)\leq 0.5$, or a step of mixing a chlorosiloxane compound of the general formula (4) and a chlorosilane compound of the following general formula (5):

(5)

wherein $R^1$, $R^2$, and r have the same meaning as provided above, and performing ammonolysis polymerization.

7. The method for producing a polysiloxazane compound according to claim 6, further comprising a step of adding an alkaline aqueous solution and performing liquid-liquid separation after the ammonolysis polymerization.

8. The method for producing a polysiloxazane compound according to claim 6, wherein the chlorosiloxane compound has the following general formula (6):

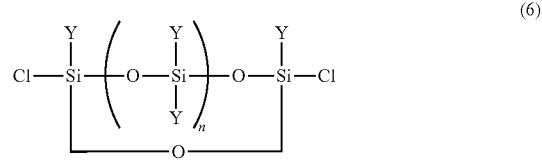
(6)

wherein n has the same meaning as provided above, Ys each independently represent a methyl group or a chlorine atom, and when the number of chlorine atoms is denoted by q, q satisfies $0<q/(2n+2)\leq 0.5$.

9. The method for producing a polysiloxazane compound according to claim 6, wherein the chlorosiloxane compound has the following general formula (7):

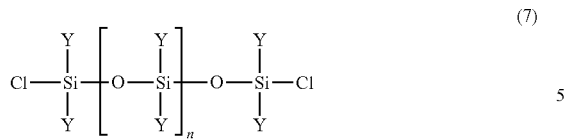

(7)

wherein n has the same meaning as provided above, Ys each independently represent a methyl group or a chlorine atom, and when the number of chlorine atoms is denoted by q, q satisfies $0 < q/(2n+2) \leq 0.5$.

10. The method for producing a polysiloxazane compound according to claim 8, wherein n in the general formula (6) is 2.

11. The method for producing a polysiloxazane compound according to claim 9, wherein n in the general formula (7) is 2.

12. A composition comprising the polysiloxazane compound according to claim 1, and a solvent.

13. The composition according to claim 12, wherein the composition is a primer.

14. A curable composition comprising the composition according to claim 13, and at least one metal selected from the group consisting of titanium, aluminum, zinc, and tin.

15. A cured product obtaining by curing the curable composition according to claim 14.

* * * * *